United State

Trcka

[11] 3,947,091

[45] Mar. 30, 1976

[54] REFLECTIVE DISPLAY APPARATUS
[75] Inventor: James S. Trcka, Cedar Rapids, Iowa
[73] Assignee: Rockwell International Corporation, El Segundo, Calif.
[22] Filed: Sept. 19, 1974
[21] Appl. No.: 507,504

[52] U.S. Cl. .......................... 350/160 LC; 40/130 R
[51] Int. Cl.² .......................................... G02F 1/13
[58] Field of Search . 350/160 LC; 40/106.1, 130 R; 240/2 AT, 2.1

[56] References Cited
UNITED STATES PATENTS
3,736,047  5/1973  Gelber et al. .................. 350/160 LC
3,768,887  10/1973  Portmann ..................... 350/160 LC Primary Examiner—John K. Corbin
Assistant Examiner—Matthew W. Koren
Attorney, Agent, or Firm—Terry M. Blackwood; Robert J. Crawford

[57] ABSTRACT

A reflective type display apparatus comprising display means having light scattering areas and transparent areas backed by light reflective means. Transparent light refracting means is disposed at the front of the display means and has nonparallel front and rear surfaces. Light absorptive means is disposed between the front surface and the display means and outside the region of transparency between the display means and an observer.

9 Claims, 7 Drawing Figures

1

REFLECTIVE DISPLAY APPARATUS

BACKGROUND OF INVENTION

This invention is related to displays which specularly and diffusely reflect light incident on the display surface back toward a frontal viewing space so as to manifest a desired indicia pattern. Such displays will be generally referred to herein merely as reflective displays.

One of the most common types of reflective display is the liquid crystal cell operated in the reflective mode. As is well known in the art, nematic liquid crystal material changes from a light transparent state to a light scattering state when subjected to an electric field. Thus by application of an electric field across patterned portions of a body of liquid crystal material an indicia pattern defined by the combination of transparent areas and light scattering areas is generated. When backed by a light reflective surface and illuminated from the front, the generated indicia pattern is manifested to an observer located in the frontal viewing space. However, the indicia pattern, or the "picture" produced, has very limited contrast. Moreover, the reflective surface backing the liquid crystal cell produces undesirable reflections of random objects, many times reflecting distracting movement or annoying light sources.

One approach to improving contrast is shown in U.S. Pat. No. 3,499,112, Heilmeier et al. Therein is described a flat, reflective type liquid crystal cell housed in a box behind an aperture approximately the same size as the cell. Hinged at one edge of the aperture, a black opaque lid is raised to permit observation of the cell at grazing angles over the opposite aperture edge. The lid protrudes significantly forward of the cell and is angularly positioned to intercept optical ray paths between itself and the observer which are specularly reflected from the reflective surface of the cell. Thus the transparent areas appear darker than the light diffusing areas.

Such an approach has several limitations. The enclosure plus protruding lid produces a very limited frontal viewing angle from which the indicia pattern may be viewed in total. Moreover the significant forward protrusion of the lid is undesirable in many applications such as aircraft cockpit displays and electronic watch displays. The same is true of other applications where thin substantially flat displays are desired or a substantially flush mounting is desired. Also, the protrusion of the lid prevents a great deal of ambient light from impinging on the diffusing areas of the liquid crystal, thereby reducing brightness of these areas. Such a reduction in brightness may counteract at least part of the additional contrast provided by the black protruding lid. Furthermore, as will be later seen, the lid blocks the light which would be most advantageous for illumination.

Thus it is an object of this invention to provide an improved reflective display apparatus which overcomes these and other disadvantages of the prior art.

These and further objects, features, and advantages of the invention will become more apparent upon reference to the following specification, claims, and appended drawings wherein:

DESCRIPTION OF THE PREFERRED EMBODIMENT

Figure 1:
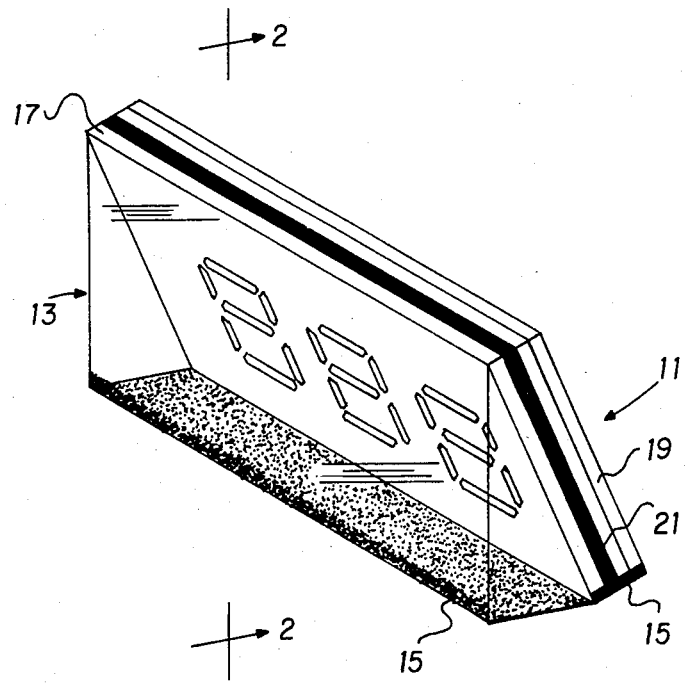
FIG. 1 is a perspective view representing the presently preferred embodiment of this invention.
Figure 2:
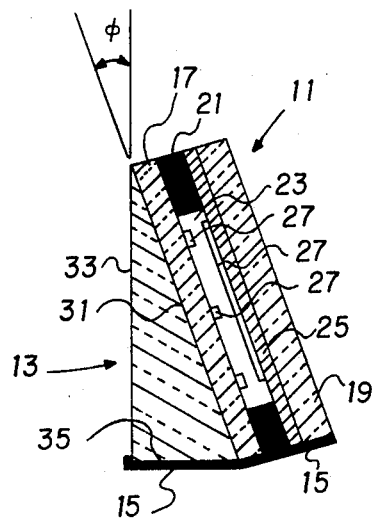
FIG. 2 is a cross-sectional view taken along line 2-2 of FIG. 1.

A display apparatus incorporating the principles of the present invention, and in addition representing the presently preferred embodiment is shown in FIGS. 1 and 2. This embodiment includes a reflective liquid crystal display 11 fronted by a substantially triangular prism 13, one of whose sides bears a light absorptive coating 15. Since liquid crystal display (LCD) devices and the associated phenomenon are detailed in the art (see U.s. Pat. Nos. 3,499,702; 3,674,341 and 3,499,112) only a brief description, appropriate for purposes of describing the present invention, and dealing with construction and operation, is presented below.

Referring then briefly to the FIG. 2 cross-sectional view, front and rear glass plates 17 and 19 in conjunction with spacer seal 21 retain liquid crystal fluid 23. (Note that the distance between plates is exaggerated for clarity.) On the inner surface of rear plate 19 is an electrically nonconductive, light reflective surface 25. The preferred reflective surface is a partially reflective, dichroic, dielectric material available from Optical Coating Laboratories Incorporated of Santa Rosa, California. The inner surface of glass plate 17 and the inner face of reflective surface 25 bear the transparent electrodes 27 that energize the liquid crystal fluid 23. In the preferred embodiment, nematic liquid crystal material is employed. The transparent electrodes 27 comprise transparent conductive material deposited on the appropriate surfaces. On one of the surfaces it is deposited in the pattern to be displayed, most generally in a segment pattern, with conductive leads brought to terminations. Generally the other electrode located opposingly across the fluid is nonpatterned and has a single lead brought to termination. The border around the perimeter of the crystal formed by spacer seal 21 is preferably black and opaque. The liquid crystal fluid area inside the border is transparent when the crystal is not energized and light impinging thereon is specularly reflected from reflective surface 25. When the electrodes forming a display character are energized, the liquid crystal fluid between the front and back electrodes dynamically scatter light and therefore appears semiopaque or translucent. More particularly, the energized portions of the fluid forward scatter light on toward the reflective surface and then forward scatter back toward an observer the light returning from the reflective surface. The size and shape of the area of light scattering is the same as the energized character forming electrode. Although their roles may occasionally be reversed as to which areas form the characters and which areas form the background, in any event the light scattering areas together with the transparent areas define the indicia to be displayed.

As will be realized, the display device may comprise any material containing both areas capable of light scattering and transparent areas. For instance, a frosted pattern on a transparent plate of acrylic plastic material, or some type of a negative.

The prism 13 of FIGS. 1 and 2 comprises a triangular block of transparent material whose surfaces have been highly polished and whose index of refraction is significantly greater than air or the environmental medium in which the display is intended to function. Glass or a transparent acrylic plastic material (e.g. Plexiglas brand acrylic material) is presently preferred.

The prism 13 is disposed at the front of the LCD and provides a transparent region of light refracting material between an observer and the LCD. The rear surface 31 of prism 13 and the front glass retaining plate of the LCD are juxtaposed, and in the preferred embodiment, are juxtaposed by bonding them together with an optically clear adhesive whose index of refraction is similar to glass. Also in the preferred embodiment the front surface 33 of prism 13 forms an angle $\phi$ with the rear prism surface 31 where $\phi$ is in the range of about $0.5\gamma_c$ to $0.9\gamma_c$ and $\gamma_c$ is the critical angle of incidence for the particular prism material employed. $\gamma_c = \sin^{-1}(Na/Ng)$ where $Na$ and $Ng$ are respectively, for the preferred embodiment, the indices of refraction of air and the prism material. It is particularly preferable that $\phi$ be approximately equal to 0.85 $\gamma_c$. Thus for the preferred material $\phi$ is approximately 35°. A light absorber 15 is disposed between the front prism surface and the LCD, but outside the region of transparency between the LCD and an observer. As indicated in FIG. 2, in the preferred embodiment the light absorber is disposed along the third lateral face 35 of the prism 13. Preferably it also extends over the adjacent edges of the LCD leaving only surface 33 from which light may enter the device and from which the device can be viewed. Also, it is preferred that the absorber extend slightly up onto face 33, curling around and covering the lower front corner of the prism. The absorber is preferably black and opaque and comprises a thin coat of black epoxy paint. Other colors which are good light absorbers may also be used.

Operation of the apparatus may best be understood by reference to FIGS. 3, 4, 5 and 6 collectively. Moreover it will be assumed that at least some light is entering the apparatus from the front and impinging on the liquid crystal fluid.

Figures 3, 4:
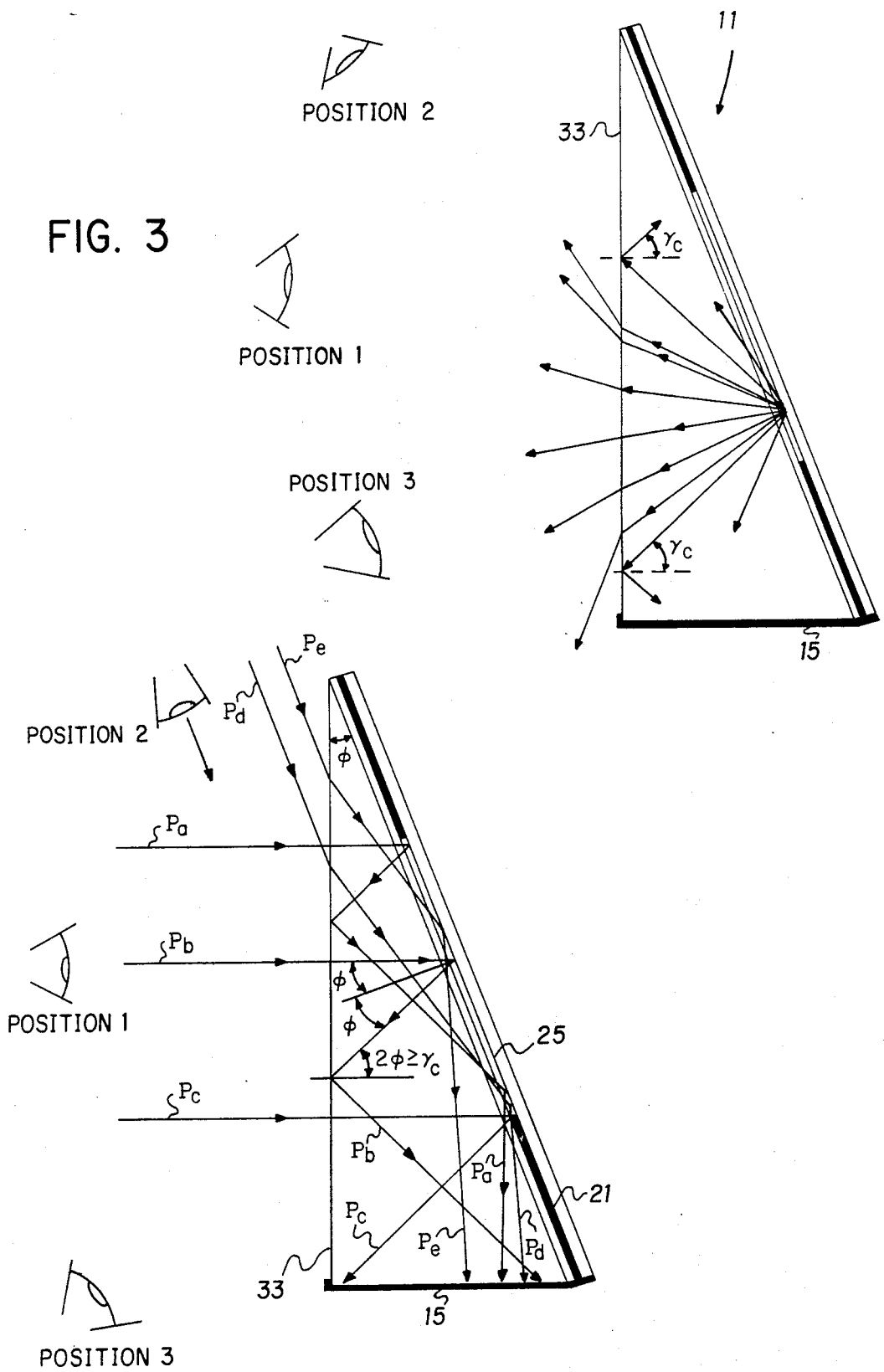
FIGS. 3, 4, 5 and 6 are somewhat schematic end views of the preferred embodiment and illustrate certain principles of operation.

Referring then to FIG. 3, an "on" liquid crystal segment in conjunction with the reflective surface diffusely reflects incident light back toward an observer. The scattered rays which strike the front prism surface 33 at an angle greater than $\gamma_c$ are internally reflected and not viewed. The rays which impinge on the front surface 33 at an angle less than $\gamma_c$ are refracted at the interface and passed on to an observer, thereby making the "on" segment visible. Theoretically, at least some light is directed to an observer anywhere to the left of front surface 33. This is, of course, because at angles approaching the critical angle of incidence the rays are bent almost parallel to the front surface 33. Thus, the angular range over which "on" segments are theoretically viewable is ± 90° with respect to a line of sight normal to the front surface. (Observer position 1 represents a zero degree line of sight; i.e. one normal to the front surface; observer position 2 represents positive viewing angles; and observer position 3 represents negative viewing angles.) However, due to loss of resolution and brightness at the larger angles, the angular range over which "on" segments provide legible indicia is, as a practical matter, less than but approaching a full 180°.

Figure 5:
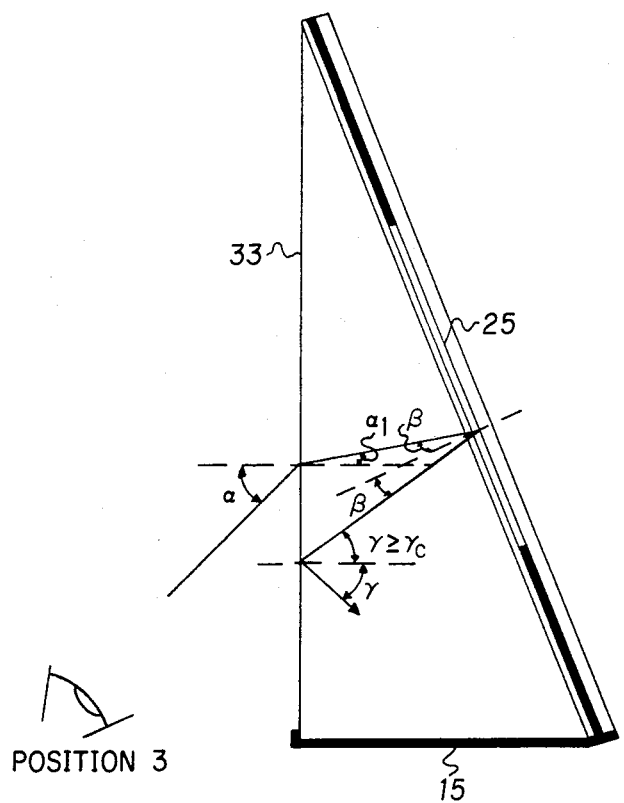

FIGS. 4 and 5 illustrate how in the preferred embodiment the background of the liquid crystal display is made to appear in contrast to the "on" segments. Briefly, all lines of sight originating from the 0° to + 90° range (i.e. positions 1 and 2) and incident on transparent liquid crystal areas are eventually terminated at light absorber 15 or seal 21 which is also a light absorber. Depending on angle $\phi$, some viewing angles below 0° (i.e. position 3) also terminate at light absorber 15. More particularly, consider ray paths $P_a$, $P_b$, and $P_c$ from observer position 1 in FIG. 4. $P_a$, $P_b$, and $P_c$ enter the prism, pass through the transparent portions of the liquid crystal fluid, and strike the reflective surface 25. Since the reflective surface is sloped at an angle $\phi$, the angle of incidence for each of $P_a$, $P_b$, and $P_c$ is equal to $\phi$ as is the angle of reflection. $P_c$ reflected directly onto absorber 15 but reflected $P_a$ and $P_b$ intersect front prism surface 33 at an angle, in this example, of $2\phi$.

Having selected $\phi$ in the preferred embodiment such that it is equal to or greater than ½ the critical angle $\gamma_c$, internal reflection occurs at front prism surface 33. $P_b$ is thus reflected onto absorber 15. $P_a$ is reflected back to reflective surface 25 from which it is then reflected onto absorber 15. Thus to an observer in position 1, all the transparent portions of the liquid crystal material appear dark and in substantial contrast to the "on" light diffusing segments. Analogous ray path tracing from an observer in position 2 to eventual termination at a light absorber, (see ray paths $P_d$ and $P_e$) shows that for positive viewing angles also, a full contrasting background is provided. Note that if absorber 15 is disposed closer to the crystal fluid than illustrated, it will terminate all the ray paths, and any reliance on absorber 21 is obviated. Depending on angle $\phi$, an observer can also view the contrasting background from negative viewing angles. For any given angle of $\phi$, there is, however, a limit of angle $\alpha$ (see FIG. 5) for which internal reflection will occur and the background contrast can be observed. A ray incident on surface 33 at an angle $\alpha$ with respect to the 0° line of sight, by Snell's law is refracted at the interface such that the ray forms angle $\alpha_1$ with respect to the 0° line of sight within the transparent portion of the prism. The relationship of $\alpha$ and $\alpha_1$ is $\sin \alpha_1 / \sin \alpha = Na/Ng$ where $Na$ = index of refraction of air = 1, and $Ng$ = index of refraction of the prism. The ray then becomes incident at reflective surface 25 of the LCD at an angle of incidence $\beta$ with respect to a normal to reflective surface 25. The angle of the reflected ray is equal to the angle of incidence $\beta$ and the ray intersects perpendicular surface 33 of the prism at angle $\gamma$. If angle $\gamma$ is greater than the critical angle of incidence, the ray is internally reflected onto absorber 15. When this occurs, the absorber is the apparent image which is observed by the viewer which in the preferred embodiment is selected to provide high contrast with energized segments. Thus the limiting angle from negative viewing aspects (i.e. position 3) is a function of the critical angle of incidence $\gamma_c$ and angle $\phi$ of the prism and it may be shown that $\gamma_c = 2\phi - \sin^{-1}[\sin \alpha \, Na/Ng]$. Although the angular range for viewing contrast is limited (in the preferred embodiment), the total angular range over which contrast is provided is a substantial increase over that obtainable with prior art reflective displays. Moreover, even though contrast may not be viewable over the full range of negative viewing angles, the "on" segments as earlier explained, are viewable from an angular range approaching 180° and encompassing both positive and negative viewing angles. This is also a substantial improvement over the prior art.

Figure 6:
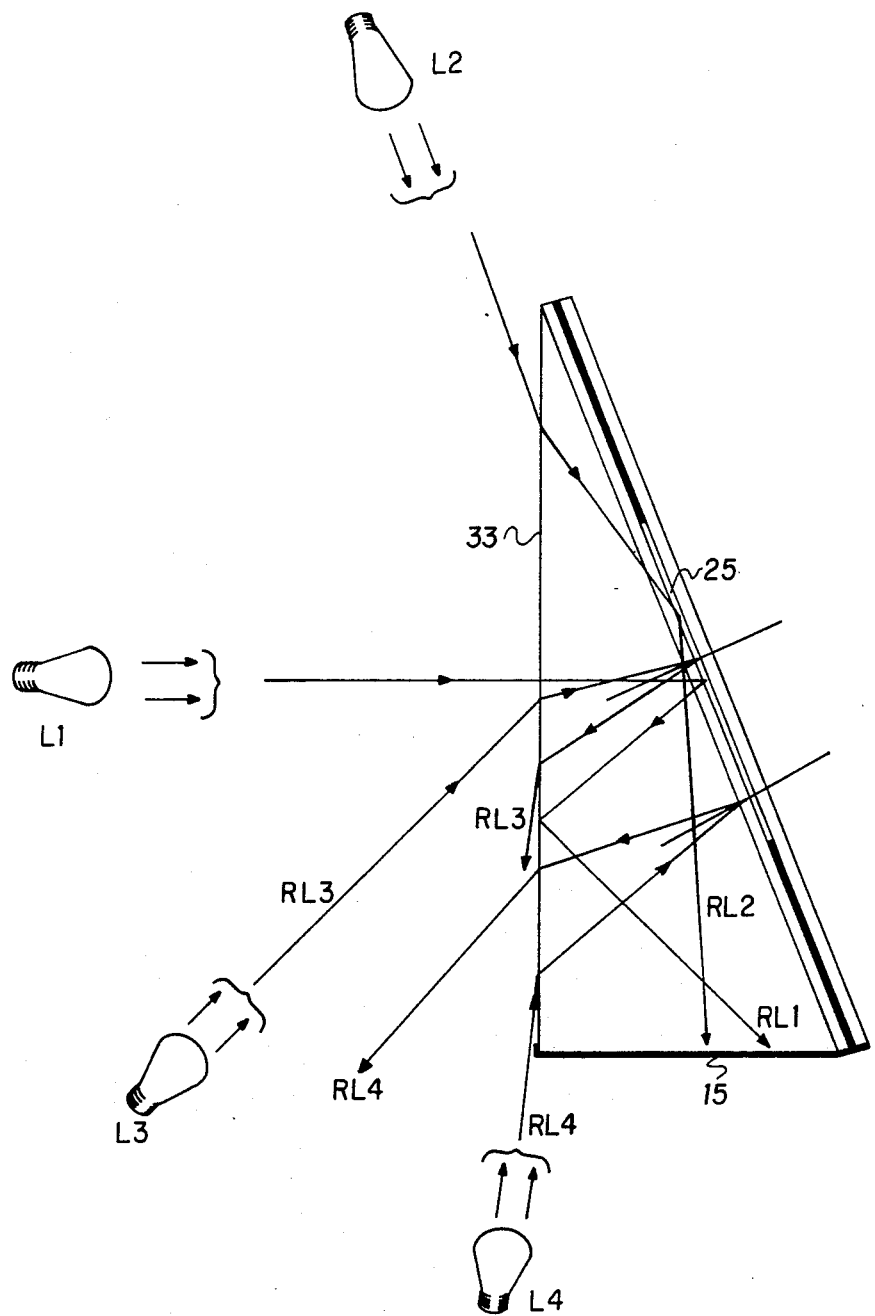

FIG. 6 illustrates some of the effects that various lighting conditions have on the preferred embodiment. As is apparent from the drawing, if light, originating from anywhere within the angular range in which contrast is provided (indicated generally by lamps L1 and L2), enters the prism and is incident on a transparent portion of the liquid crystal material, it is reflected on toward, and eventually terminated at, a light absorptive surface. Thus light originating from these positions never escapes the prism and is never observed directly. Moreover, light from these angular aspects provides some illumination of the light diffusing "on" segments and contributes to the brightness observed from any of the positions 1, 2, or 3 as previously defined.

If light, originating from negative viewing angles outside the contrast-viewing angular range (indicated by lamps L3 and L4), enters the prism and is incident on transparent fluid areas and on reflective surface 25 of the LCD, it is reflected back toward the front prism surface 33 at an angle which permits it to escape. However, this light is always directed back into the region below the contrast-viewing range and is not viewable from observer position anywhere within the contrast-viewing range. More particularly, assuming that lamp L3 is just outside of the contrast-viewing range, ray RL3, after reflection from surface 25, is incident on prism surface 33 at an angle, with respect to a surface 33 normal, which is less than the critical angle, and the ray emerges from the prism. However, it emerges at an angle which is nearly parallel to the surface 33 and well out of the contrast-viewing range. Light rays from lamp L4 which, prior to entering the prism, are nearly parallel to the surface 33, emerge, following reflection from surface 25, from the prism at an angle which is just slightly outside the limiting angle $\gamma$ determined as hereinabove described.

Rays such as $R_{L4}$ from lamp L4 are particularly desirable for increasing brightness of the "on" segments. This is because the intensity of the diffused light scattered back from the LCD toward the front prism surface 33 is somewhat directional, tending to be greater in the direction a specularly reflected ray would have taken. Thus it is seen that a larger component of backscattered light is available to an observer when illumination is provided from the negative viewing angles, and especially from large negative viewing angles.

From the theory of operation set forth above, it is seen why the preferred range of values for $\phi$ is between $0.5\gamma_c$ and $0.9\gamma_c$ and the preferred value for $\phi$ is $0.85\gamma_c$. At values of $\phi$ less than $0.5\gamma_c$, the angular viewing range over which contrast is provided becomes smaller than 90° and is thus somewhat inconvenient for the intended applications. Moreover, for $\phi < 0.5\gamma_c$, the contrast-viewing angle decreases quite rapidly. At values of $\phi$ greater than $0.9\gamma_c$, the brightness of the "on" segments decreases because of the aforementioned directionality of scatter inherent in reflective LCD's and other reflective displays. For $\phi$ between $0.5\gamma_c$ and $0.9\gamma_c$, and especially for $\phi = 0.85\gamma_c$ the preferred combination of contrast-providing viewing angle and brightness occurs. However, the apparatus is still operative outside this range of $\phi$, and for some applications, values of $\phi$ outside the preferred range may provide quite adequate results.

It should also be apparent from the foregoing that certain other details of the preferred embodiment are not essential in the implementation and practice of the principles of the present invention. For instance, it is not necessary to accomplish the juxtaposition of the rear prism surface and the front of the LCD by optical bonding. Neither attachment nor contact therebetween is essential. Although a poor optical match, such as an air gap therebetween produces, reduces the useable viewing range (due to total internal reflection at the rear prism surface of incoming rays oriented along the larger angle paths preventing an observer outside the reduced range from seeing the LCD) the apparatus still operates as hereinabove described but within a more limited angular range.

Figure 7:
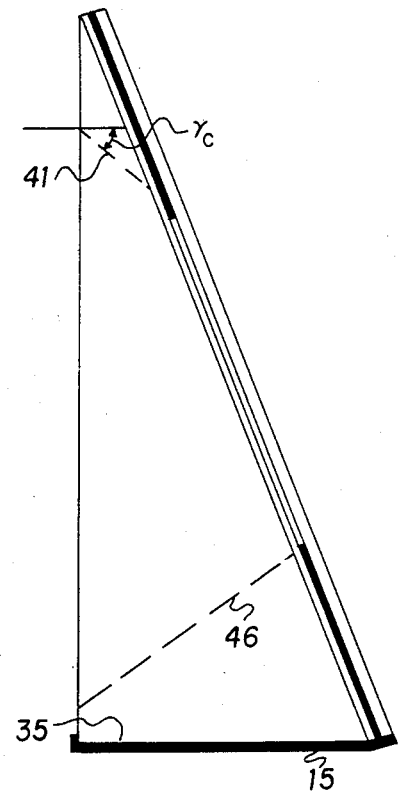
FIG. 7 is a somewhat schematic end view representing exemplary alternatives to the preferred embodiment.

As a further example of nonessential, although preferable, detail, the prism need not be triangular. A prism truncated along a line extending from the top of the liquid crystal material and intersecting the front prism surface at an angle $\gamma_c$ (see dotted line 41 in FIGS. 7) would function in a manner substantially identical to the aforedescribed preferred embodiment. Also lateral face 35 and absorber 15 could be replaced with a differently disposed face, also bearing an absorber, (see dotted line 46 in FIG. 7) or a combination of prism faces plus absorber.

Moreover, the light refracting body need not be a prism in the strictest sense of the word. A prism is generally defined to be a polyhedron which in turn is solid with faces formed from plane polygons. It should be apparent that neither the front or rear surface need be planar. Although substantially planar surfaces are preferred for simplicity and because LCD cells are themselves generally planar, it is sufficient that the front and rear surfaces, whether curved or planar, be nonparallel so as to control the optical rays in accordance with the inventive teachings herein. In like manner, as long as light absorptive means is disposed between the front surface and the display means in accordance with the inventive teachings herein, it is substantially immaterial whether it is disposed along a planar face, a plurality of planar faces, a curved surface, or even within the body of refracting material itself.

Thus while particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. A reflective type display apparatus comprising:
   a. display means having transparent areas and areas capable of light scattering, said areas together defining indicia to be displayed;
   b. light reflective means disposed at the back of said display means;
   c. transparent light refracting means disposed at the front of said display means and providing a transparent region between said display means and an observer wherein the index of refraction is greater than that of the environmental medium in which the display is operating, said transparent light refracting means configured to include (i) a rear surface in juxtaposition with said display means, and (ii) a front surface nonparallel to said rear surface; and d. light absorptive means disposed continuously along a path between said front surface and said display means up to and touching said light reflective means, whereby substantially no light can enter the apparatus except from the front surface of said transparent light refracting means; said light absorptive means further disposed relative to said front surface such that at least some specularly reflected rays propagating from said transparent areas are routed to said absorptive means only after internal reflection from said front surface, whereby said front surface is employed to provide an image of, and extend the effect of, said absorptive means.

2. Apparatus as defined in claim 1 wherein said rear surface of said refracting means and said display means are optically bonded together.

3. A reflective type display apparatus comprising: light reflective means; display means having areas capable of light scattering and transparent areas backed by said light reflective means; light absorptive means; and transparent, light refracting means configured to include first and second nonparallel substantially planar surfaces connected by a third surface, said first surface in juxtaposition with said display means, said second surface providing an area from which said display means may be viewed, and said third surface bearing said light absorptive means, said light absorptive means extending continuously from a location on said second surface adjacent the junction of said second and third surfaces to said display means so that said light absorptive means touches said light reflective means, said third surface and said light absorptive means being appropriately disposed relative to said second surface such that at least some specularly reflected rays propagating from said transparent areas are routed to said absorptive means only after internal reflection from said second surface, whereby said second surface is employed to provide an image of, and extend the effect of, said absorptive means.

4. Apparatus as defined in claim 3 wherein said first surface and said display means are optically bonded together.

5. Apparatus as defined in claim 3 wherein the planes containing said first and second surfaces intersect at an angle $\phi$ where $\phi$ is in a range of about $0.5\gamma_c$ to $0.9\gamma_c$ and $\gamma_c$ is the critical angle of incidence for the particular light refracting material employed.

6. Apparatus as defined in claim 5 wherein $\phi$ is approximately equal to $0.85\gamma_c$.

7. Apparatus as defined in claim 6 wherein $\phi$ is approximately 35°.

8. Apparatus as defined in claim 5 wherein said light absorptive means is further disposed such that said light absorptive means obstructs substantially no rays propagating from light scattering areas toward said second surface at an angle, with respect to a normal to said second surface, of less than $\gamma_c$, whereby the light scattering areas are viewable from substantially anywhere in a 180° frontal angular viewing range.

9. Apparatus as defined in claim 3 wherein said display means comprises a nematic liquid crystal display which includes transparent retaining means, nematic liquid crystal material inside said retaining means, and transparent electrode means arranged in an appropriate pattern for defining the indicia to be displayed, said electrode means causing, when energized, predetermined portions of the liquid crystal material to become said light scattering areas.

* * * * *